United States Patent
Branda et al.

(10) Patent No.: US 7,478,284 B2
(45) Date of Patent: Jan. 13, 2009

(54) METHODS, SYSTEMS, AND COMPUTER PROGRAM PRODUCTS FOR COMPENSATING FOR DISRUPTION CAUSED BY TRACE ENABLEMENT

(75) Inventors: Steven J. Branda, Rochester, MN (US); Kristi P. Peterson, Rochester, MN (US); John J. Stecher, Rochester, MN (US); Matthew R. Weaver, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 11/278,978

(22) Filed: Apr. 7, 2006

(65) Prior Publication Data
US 2007/0260935 A1 Nov. 8, 2007

(51) Int. Cl.
*G06F 11/00* (2006.01)
(52) U.S. Cl. .......................................... 714/38; 717/124
(58) Field of Classification Search .................... 714/36, 714/37, 38, 45; 717/124, 125, 126
See application file for complete search history.

(56) References Cited

U.S. PATENT DOCUMENTS

| 6,055,492 | A  | * | 4/2000 | Alexander et al. | .......... 702/179 |
| 6,349,406 | B1 | * | 2/2002 | Levine et al.    | .......... 717/128 |
| 6,546,548 | B1 | * | 4/2003 | Berry et al.     | .......... 717/128 |
| 6,598,012 | B1 | * | 7/2003 | Berry et al.     | .......... 702/187 |
| 6,732,357 | B1 | * | 5/2004 | Berry et al.     | .......... 717/158 |
| 6,738,778 | B1 | * | 5/2004 | Williamson et al.| .......... 707/101 |
| 7,039,644 | B2 | * | 5/2006 | Hind et al.      | .......... 707/101 |

* cited by examiner

*Primary Examiner*—Dieu-Minh Le
(74) *Attorney, Agent, or Firm*—Cantor Colburn LLP

(57) ABSTRACT

A method for compensating for disruption caused by trace enablement is provided. The method includes receiving a selected target to run a program, receiving a selected program that has been identified as having a problem, and receiving a selected trace type. The method also includes enabling a trace compensator for identifying non-critical code in the selected program. The non-critical code is determined by the trace type. The method further includes running the program with a trace to identify the problem, the trace compensator causing the program to suppress the non-critical code for problem reproduction to adjust for timing discrepancies.

6 Claims, 2 Drawing Sheets

US 7,478,284 B2

METHODS, SYSTEMS, AND COMPUTER PROGRAM PRODUCTS FOR COMPENSATING FOR DISRUPTION CAUSED BY TRACE ENABLEMENT

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to program tracing and debugging, and particularly to methods, systems, and computer program products for compensating for disruption caused by trace enablement.

2. Description of Background

Enabling trace on a process, such as an application server oftentimes changes the event timing of the process. The change in timing may prevent the recreation of some problems which is known to make debugging and solving a problem more difficult and time consuming. Some current solutions include providing the ability to perform traces with varying granularity that allows for more or less trace to be collected. This potentially gives a user less trace than they really need, since choosing the level of trace involves some measure of guesswork.

What is needed, therefore, is a way to compensate for the change in timing from enabling trace points in a manner that provides an optimum level of trace in order to facilitate the detection of problems that occur during execution of a program.

SUMMARY OF THE INVENTION

The shortcomings of the prior art are overcome and additional advantages are provided through the provision of methods, systems, and computer program products for compensating for disruption caused by trace enablement. The method includes receiving a selected target to run a program, receiving a selected program that has been identified as having a problem, and receiving a selected trace type. The method also includes enabling a trace compensator for identifying non-critical code in the selected program. The non-critical code is determined by the trace type. The method further includes running the program with a trace to identify the problem, the trace compensator causing the program to suppress the non-critical code for problem reproduction to adjust for timing discrepancies.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which compensates for the change in timing from enabling trace points in a manner that provides an optimum level of trace in order to facilitate the detection of problems that occur during execution of a program.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
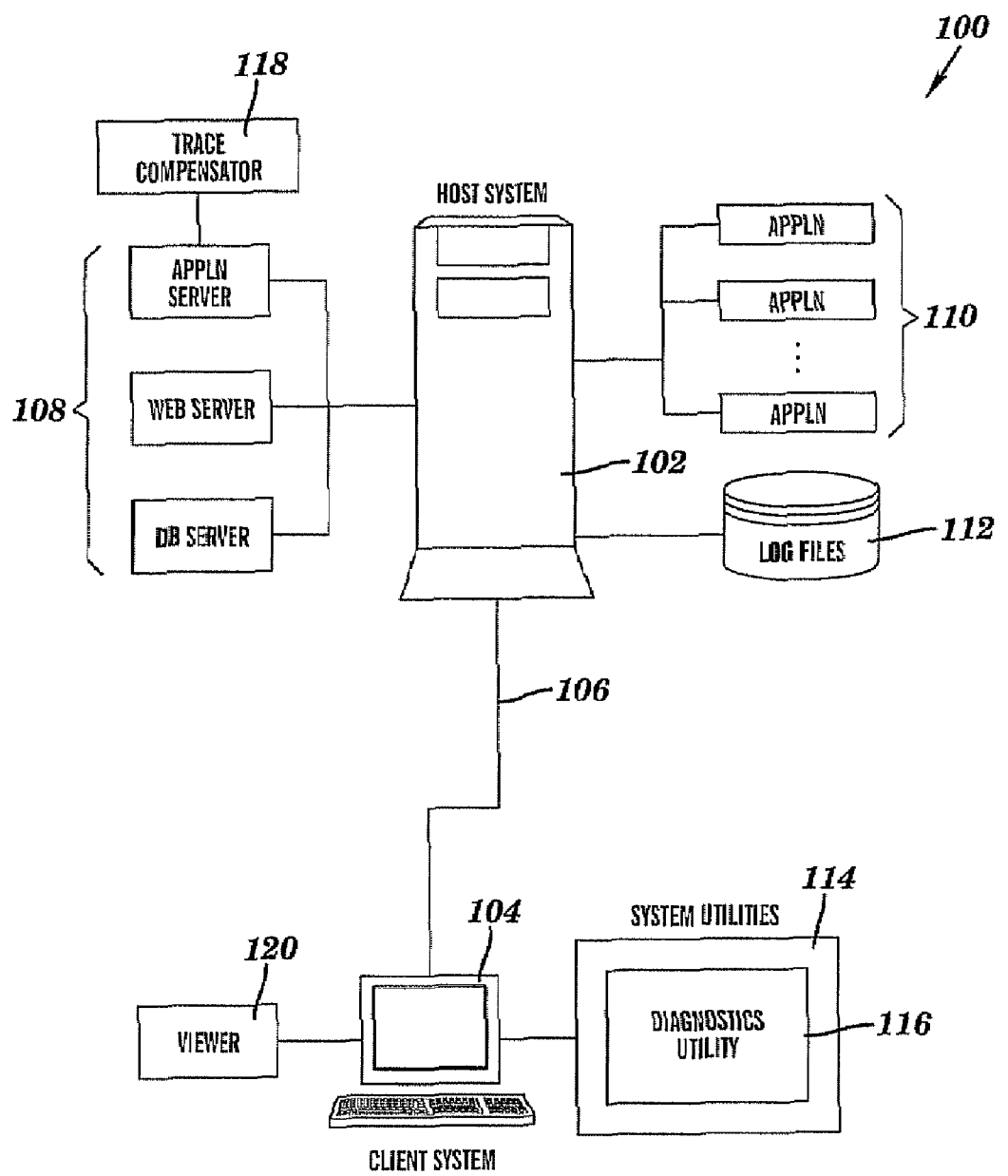
FIG. 1 illustrates one example of a block diagram upon which the trace timing compensation processes may be implemented in accordance with exemplary embodiments.

Turning now to FIG. 1, an exemplary system 100 upon which the trace timing compensation processes may be implemented will now be described. The system 100 of FIG. 1 includes a host system 102 in communication with a client system 104 over a network 106. Host system 102 may be high-speed processing device, e.g., a mainframe computer, which handles a large volume of processing activities. Host system 102 executes various programs, such as an operating system, middleware, and various business or enterprise applications 110. Types of middleware executable by the host system 102 may include one or more servers 108. For illustrative purposes, as shown in FIG. 1, host system 102 is executing an application server, a web server, and a database server as its middleware. Application server 108 implements a trace compensator tool 118 for executing the trace compensation processes described herein. The trace compensator 118 disables or suppresses non-critical messages or operations of a program in order to balance out the increased time caused by an enabled trace.

Applications 110 (i.e., business/enterprise applications) may include, for example, web artifacts, such as a servlet. If host system 102 utilizes Java-based programming tools, these applications may include, e.g., Enterprise Java Beans (EJBs) or Java Server Pages (JSPs), to name a couple. Host system 102 also includes memory, which may be internal to the host system 102, external to the host system 102, or a combination thereof. The memory, or storage 112, is physically and/or logically coupled to the host system 102. As shown in FIG. 1, storage 112 houses log files and trace compensation tables as will be described further herein.

Client system 104 may comprise a workstation or other general-purpose computer device. Client system 104 may be implemented by a software engineer or tester, a network administrator, or information technology (IT) specialist. Client system 104 executes various applications including an operating system and system utilities 114 for monitoring and managing the applications and processes executing on host system 102. System utilities 114 include a diagnostics utility that includes one or more trace tools. Various trace types, e.g., security trace, database process trace, server process trace, may be implemented via diagnostics utility 116. Diagnostics utility 116 may also include a debugging program. The diagnostics utility 116 is in communication with the trace compensator 118 for implementing the trace timing compensation processes described herein.

In addition, a viewer 120 is also executing on client system 104 for enabling the graphical display of traces resulting from the trace timing compensation activities.

The aforementioned system components of FIG. 1 may utilize an application development toolkit (ADK), such as JDK and a compiler as will be described further herein.

Network 106, may be a local network (e.g., LAN), a wide area network, or internetwork (e.g., Internet). Alternatively, the client system 104 may be in direct communication with host system 102 via, e.g., physical cabling or wireless means.

Figure 2:
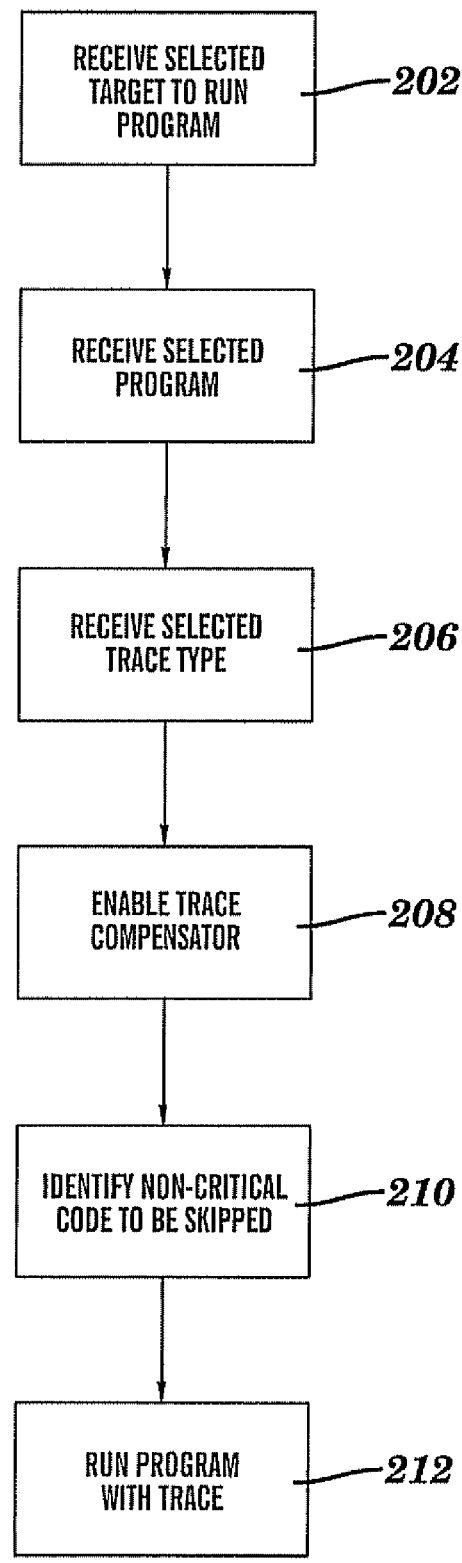
FIG. 2 illustrates one example of a flow diagram describing a process for implementing the trace timing compensation processes in exemplary embodiments.

Turning now to FIG. 2, a process for implementing the trace timing compensation processes will now be described in exemplary embodiments. For purposes of illustration, it will be assumed that a problem has been detected as a result of executing a process/program on a server (e.g., application server 108) of host system 102. A user at client system 104 enters the following information into the client system 104, which is processed by the system utilities 114 as described herein. At step 202, the trace compensator 118 receives a selected target on which to run the program (i.e., the program in which a problem has been detected). The target may be the server associated with the defective program.

At step 204, the trace compensator 118 receives the selected program to run, followed by the selected trace type at step 206. The trace type selection may determine the means by which the trace compensator 118 performs the timing compensation processes. For example, JDK may be used to manage the particular portion of code that is skipped during runtime. Several groups of SystemOut messages, method signatures, code templates, etc., might be assembled depending upon the type of trace. This may be accomplished by identifying the code via a list of packages and classes from which methods will not be invoked or a list of methods not to be invoked. Alternatively, the code may be identified by a source code or byte code template that is slipped by the compiler or JVM when encountered. For example, all FFDC branches could be stubbed out in the template as:

```
If (WASConfig.FFDC.initialized( )){
...
}
```

Then this would be skipped in the source code (in the native compilation case) or would be converted to bytecode (in the JVM case) and when the JVM encounters the bytecode, it would mark that branch to be slipped.

When a trace string is selected, the trace compensator 118 would identify related things that are not likely to be necessary for the bug recreation. For instance, on a workload management enabled trace, communication related items would stay normal, but perhaps some security messages and function would be suppressed. In exemplary embodiments, the trace compensation service may be built, configured and run in three stages as described herein.

In a first stage (e.g., in an application development stage using, e.g., WebSphere® Application server), an application is built by developers using suitable, existing that including adding tracing points to existing application architecture for debugging issues. In a second stage (tracing and debugging development), component level application tracing points are identified and added into a compensation table, a sample of which is provided below.

| Level | Web Container | EJB Container | RRA |
| --- | --- | --- | --- |
| 1 | Disable FFDC (First failure data capture) | Disable FFDC (First failure data capture) | Disable FFDC (First failure data capture) |
| 2 | HTTP Request URL transformation | Disable Caching cleanup | Disable Connection Sharing |
| 3 | Limit Requests Entering System | Limit Active EJBs | Limit Active Database Connections |

The compensation table above outlines different levels of compensation for different components inside of the application. As the level of the compensation rises, the features that are being disabled to compensate for tracing become more risky and invasive on the system and application.

In a third stage (production level configuration), once tracing is enabled, the service 118 defaults to level 1 for every component so a user (e.g., user of client system 104) does not need to directly configure the service 118. If the user decides the trace compensation is not helpful in offsetting the overhead of tracing, he/she may either configure individual components in order to have a higher level of compensation applied, or raise the server wide defaults for compensation.

Returning now to FIG. 2, the user of client system 104 enables the trace compensator 118 at step 208. Non-critical code of the program to be run is selected (i.e., to be slipped) at step 210 via, e.g., a compiler. At step 210, the program is run with the trace. The trace timing is compensated by the code suppression to eliminate or minimize any timing inefficiencies otherwise resulting from the execution of a trace. Various trace files resulting from the processes described in FIG. 2 may be stored in log files of storage 112.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for compensating for timing disruptions caused by trace enablement, comprising:
   receiving a selected target to run a program;
   receiving a selected program that has been identified as having a problem;
   receiving a selected trace type;
   enabling a trace compensator, the trace compensator identifying non-critical code in the selected program, the trace compensator enabled by:
      adding tracing points to existing application architecture debugging issues; and
      identifying component-level application tracing points and adding the component-level application tracing points to a compensation table, the compensation table specifying varying levels of compensation for specified components in the application;
      wherein, highest levels of compensation reflect a greatest risk to the operation of the selected program and the target, upon disabling components to compensate for timing discrepancies due to tracing, the non-critical code determined by corresponding levels of compensation and the trace type; and
   running the selected program with a trace to identify the problem, the trace compensator causing the selected program to suppress the non-critical code for problem reproduction to adjust for timing discrepancies.

2. The method of claim 1, wherein the identifying non-critical code is implemented via at least one of:
   a list of packages and classes from which methods will be refrained from invocation;
   a list of specific methods for refrain from invocation; and
   a source code or byte code template that is skipped by a compiler or Java virtual machine when encountered.

3. A system for compensating for timing disruptions caused by trace enablement, comprising:
   a processor in communication with a host system;
   a trace compensator executing on the processor, the trace compensator performing:
      receiving a selected target on the host system to run a program;
      receiving a selected program that has been identified as having a problem;
      receiving a selected trace type;
      enabling the trace compensator, the trace compensator identifying non-critical code in the selected program, the trace compensator enabled by:
         adding tracing points to existing application architecture debugging issues; and
         identifying component-level application tracing points and adding the component-level application tracing points to a compensation table, the compensation table specifying varying levels of compensation for specified components in the application;
         wherein, highest levels of compensation reflect a greatest risk to the operation of the selected program and the target, upon disabling components to compensate for timing discrepancies due to tracing, the non-critical code determined by corresponding levels of compensation and the trace type; and
      running the selected program with a trace to identify the problem, the trace compensator causing the selected program to suppress the non-critical code for problem reproduction to adjust for timing discrepancies.

4. The system of claim 3, wherein the identifying non-critical code is implemented via at least one of:
   a list of packages and classes from which methods will be refrained from invocation;
   a list of specific methods for refrain from invocation; and
   a source code or byte code template that is skipped by a compiler or Java virtual machine when encountered.

5. A computer program product for compensating for timing disruptions caused by trace enablement, the computer program product comprising a computer storage medium readable by a computer and storing instructions for execution by the computer, the computer readable instructions implementing a method, the method comprising:
   receiving a selected target to run a program;
   receiving a selected program that has been identified as having a problem;
   receiving a selected trace type;
   enabling a trace compensator, the trace compensator enabled by:
      adding tracing points to existing application architecture debugging issues; and
      identifying component-level application tracing points and adding the component-level application tracing points to a compensation table, the compensation table specifying varying levels of compensation for specified components in the application;
      wherein, highest levels of compensation reflect a greatest risk to the operation of the selected program and the target, upon disabling components to compensate for timing discrepancies due to tracing, the trace compensator identifying non-critical code in the selected program, the non-critical code determined by corresponding levels of compensation and the trace type; and
   running the selected program with a trace to identify the problem, the trace compensator causing the selected program to suppress the non-critical code for problem reproduction to adjust for timing discrepancies.

6. The computer program product of claim 5, wherein the identifying non-critical code is implemented via at least one of:
   a list of packages and classes from which methods will be refrained from invocation;
   a list of specific methods for refrain from invocation; and
   a source code or byte code template that is skipped by a compiler or Java virtual machine when encountered.

* * * * *